Inventor
FERDINAND C ROHWER

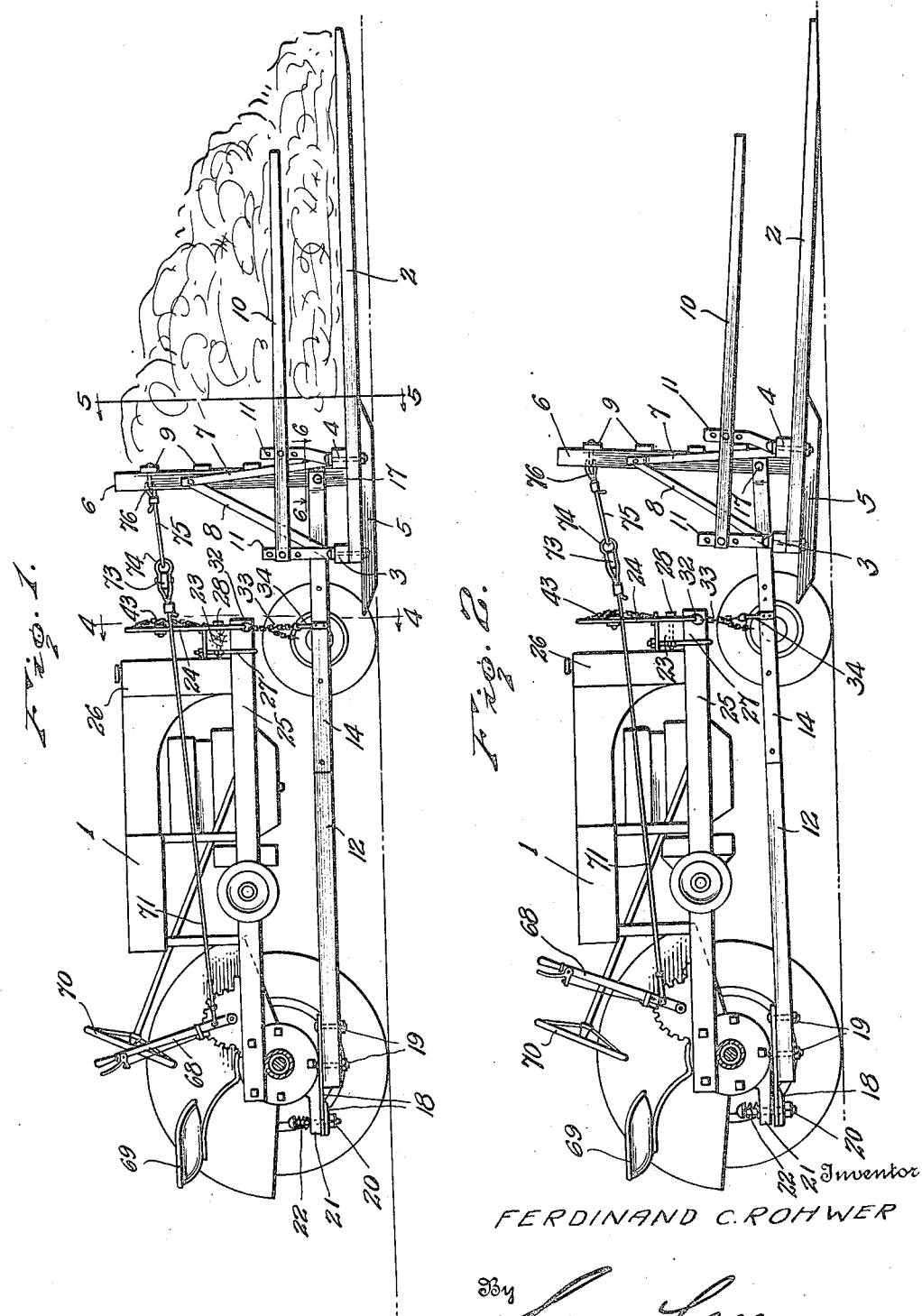

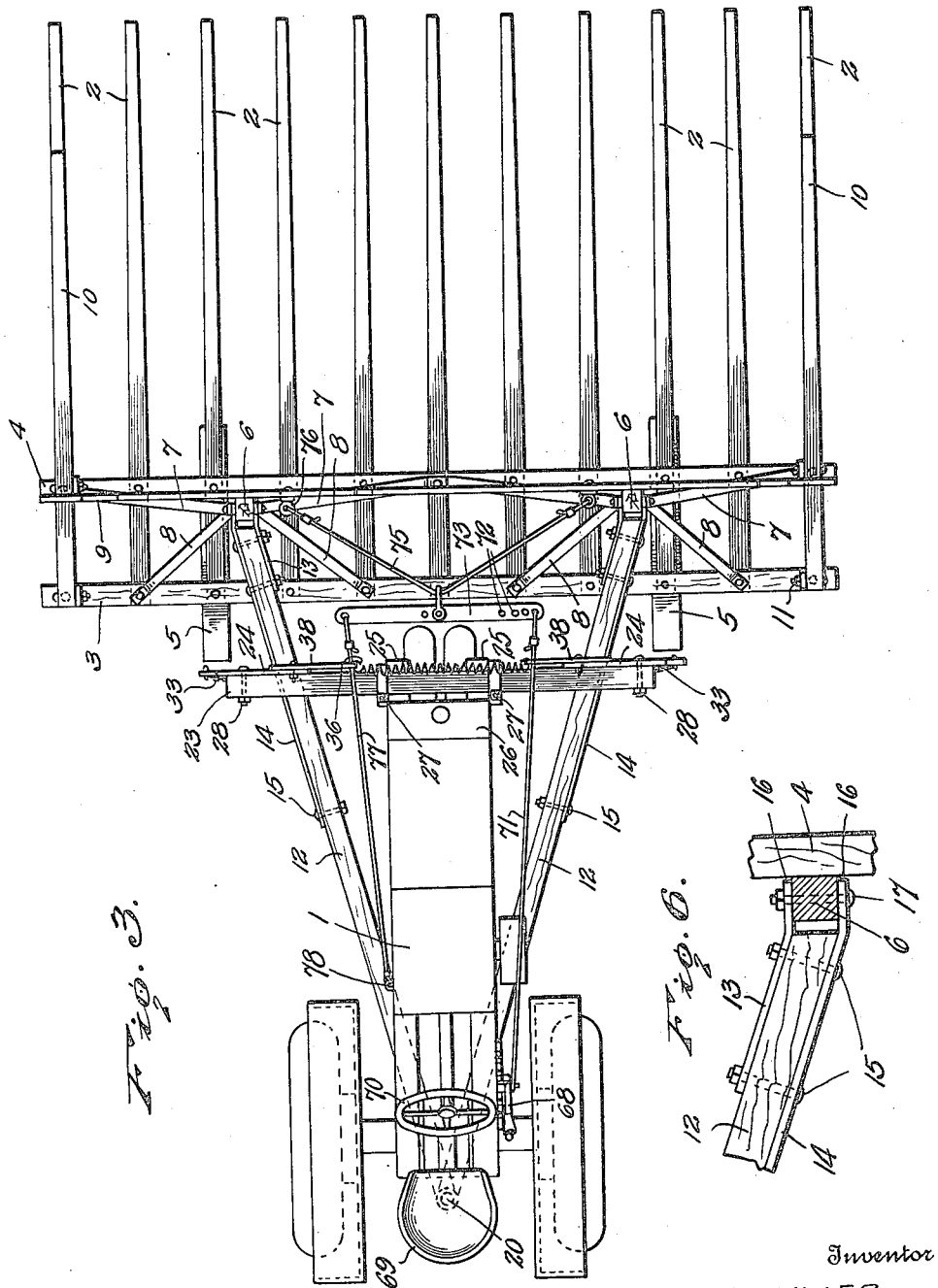

Nov. 29, 1938.  F. C. ROHWER  2,138,711
HAY SWEEP
Filed May 17, 1937  4 Sheets-Sheet 4

Inventor
FERDINAND C. ROHWER
By Lacey & Lacey, Attorneys

Patented Nov. 29, 1938

2,138,711

UNITED STATES PATENT OFFICE 2,138,711

HAY SWEEP

Ferdinand C. Rohwer, Elkhorn, Nebr.

Application May 17, 1937, Serial No. 143,169

8 Claims. (Cl. 56—27)

This invention relates to a hay sweep, and one object of the invention is to provide a device of this character so constructed that it may be mounted in front of a tractor and move with the tractor across a field so that hay or bundles of grain may be picked up and transported in large quantities.

Another object of the invention is to provide improved means for mounting the hay sweep in front of the tractor and so constructing the same that it may conform to the contour of the surface of the ground over which it passes. It will thus be seen that, while the hay sweep will have its fork yieldably supported in a normally horizontal position, it may be tilted transversely when passing over high or low spots in a field and all of the hay or bundles of grain taken up from the field.

Another object of the invention is to provide improved means for vertically adjusting the hay sweep and causing it to be moved forwardly with the fork in either an elevated position while being transported from one place of use to another or in a lowered position close to the ground while in use.

Another object of the invention is to so construct the means for supporting the fork in a vertically adjusted position that this supporting means may be actuated through the medium of a lever mounted upon the tractor in such a position that it can be easily reached by the person operating the tractor.

Another object of the invention is to provide a hay sweep which is comparatively simple in construction, strong and durable and capable of being very easily applied to a tractor of a conventional construction.

The invention is illustrated in the accompanying drawings, wherein

Figure 4:
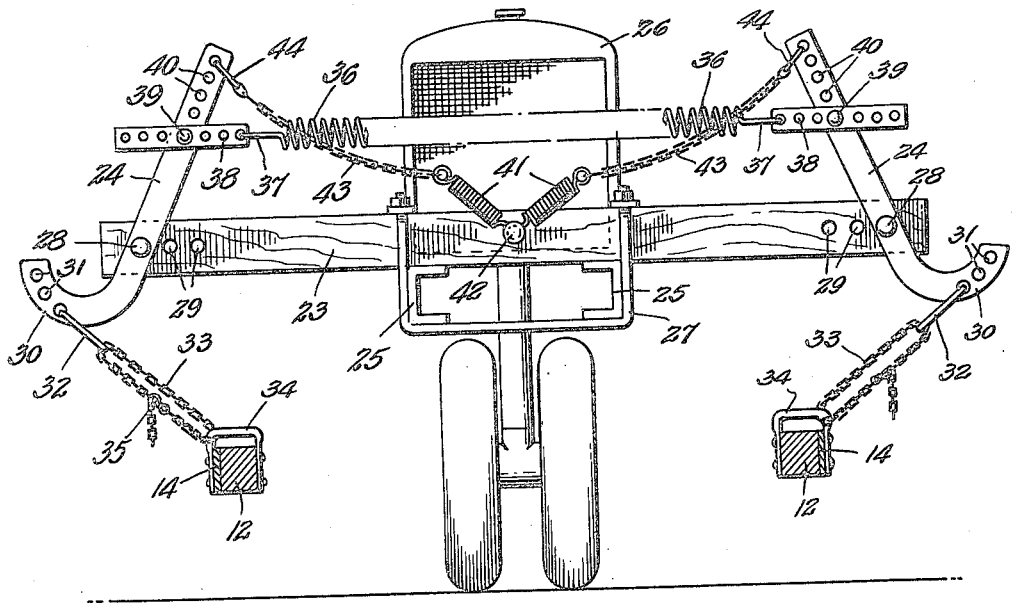
Figure 5:
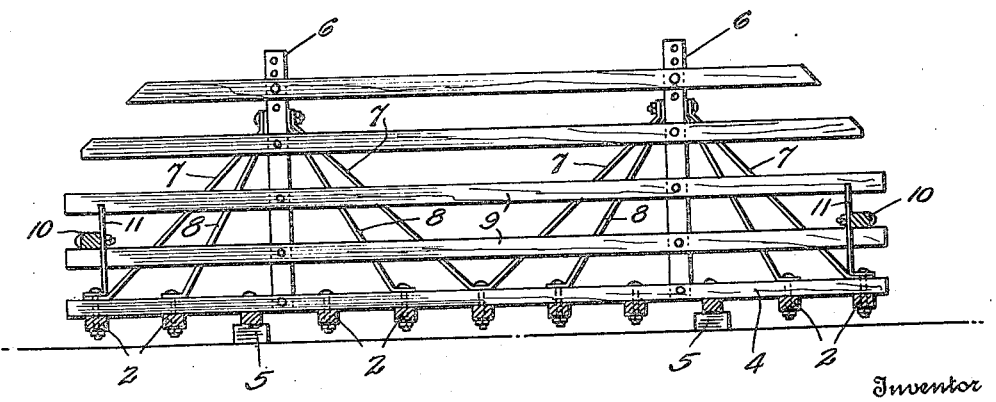
Figure 7:
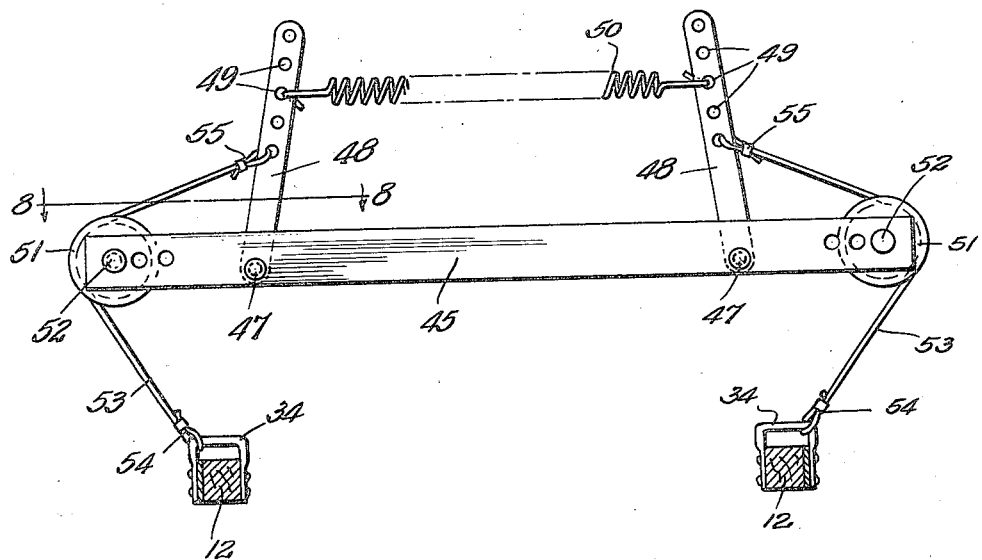
Figure 9:
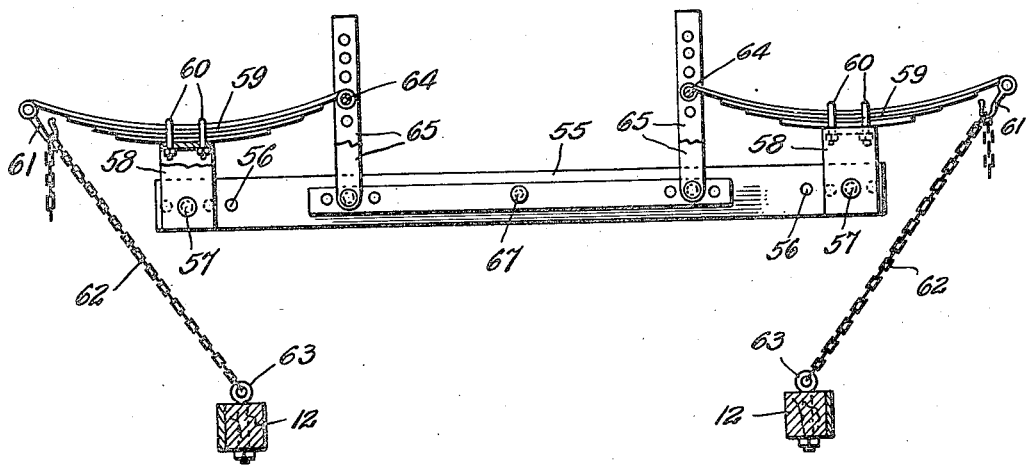
Figure 8:
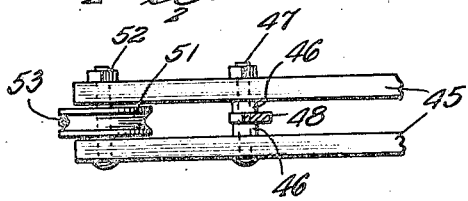

Figure 1 is a view in side elevation showing the improved hay sweep applied to a tractor of a conventional construction and loaded with hay, Figure 2 is a view similar to Figure 1 showing the hay sweep ready for use, Figure 3 is a top plan view of the improved hay sweep and the tractor to which it is applied, Figure 4 is a view upon an enlarged scale taken along the line 4—4 of Figure 1, Figure 5 is a sectional view taken along the line 5—5 of Figure 1, Figure 6 is a fragmentary view taken along the line 6—6 of Figure 1, Figure 7 is a view similar to Figure 4 with the tractor omitted and illustrating a modified construction, Figure 8 is a view taken along the line 8—8 of Figure 7, and Figure 9 is a view similar to Figure 7 illustrating another modified construction.

This improved hay sweep is mounted in front of a tractor when it is in use and has been so shown in Figures 1, 2 and 3 wherein the numeral 1 indicates in general a tractor of a conventional construction. The specific construction of the tractor is not important since the hay sweep may be applied to any well-known make of tractor.

This improved hay sweep may be of any width desired and is provided with a plurality of tines or bars 2 having their rear ends folded or otherwise secured to a cross bar 3 and a second cross bar 4 to form a fork. While the fork has been shown provided with eleven tines or bars 2, it is to be understood that any number desired may be provided and also that they may be secured to the cross bars 3 and 4 in any desired spaced relation to each other. Skids 5 which extend longitudinally of the fork are secured against the under faces of certain of the bars 2 and have doubled ends, as shown in Figures 1 and 2, so that they may easily move along the ground either forwardly or rearwardly. Standards 6 extend upwardly from the cross bar 4 and have their lower ends folded or otherwise firmly secured thereto, as shown in Figure 5. These standards are to be firmly supported in an upright position, and in order to do so, there have been provided braces 7 and 8 formed of strong metal, the braces 7 having their lower ends bolted to the cross bar 4 at opposite sides of the standards and the braces 8 extending rearwardly from the standards in diverging relation thereto and having their lower ends secured upon the cross bar 3. It will thus be seen that the standards will be firmly braced against movement out of a perpendicular position either longitudinally or transversely of the fork. A plurality of strips 9 which may be forked of wood or thin metal are secured against front faces of the standards in vertical spaced relation to each other and together with the standards provide the fork with a wall or backing serving to retain the hay or bundles of grain against rearward movement off the fork. There have also been provided arms or bars 10 which are secured upon brackets 11 extending transversely from the standards, and since these arms or bars extend forwardly from the standards over the tines of the fork, they will extend through hay piled upon the fork and very effectively prevent the hay from shifting transversely of the fork and dropping from sides thereof.

In order to mount the fork in front of the tractor and impart forward movement thereto as the tractor is driven forwardly, there have been provided beams or bars 12 which may be referred to as thrust bars. These thrust bars may be formed of wood or metal and against inner and outer side faces of these thrust bars are secured strips 13 and 14 which are secured by bolts 15. Forward ends of the strips 13 and 14 project forwardly from the bars 12 to provide hinge ears 16, and upon referring to Figure 6, it will be seen that these ears are bent so that they may be secured in flat contacting engagement with opposite side faces of the standards 6 by bolts 17 and allow the fork to be tilted vertically relative to the thrust bars or beams 12 which extend rearwardly in converging relation to each other. These thrust bars extend longitudinally of the tractor between the front and rear wheels thereof and at their rear ends carry mounting strips 18 which are secured upon upper faces of the bars by bolts 19 and have their rear ends projecting from the thrust bars. The rearwardly extending ends of the metal strips 18 are disposed in overlapped relation to each other and provide ears through which a bolt 20 passes. This bolt 20 extends vertically through the drawbar 21 at the rear end of the tractor and a helical spring 22 is coiled about this bolt or coupling pin between the head of the pin and the upper face of the drawbar. It will thus be seen that limited downward movement of the thrust bars will be permitted and this movement yieldably resisted so that the drawbars will be normally held in the horizontal position shown in Figure 1. The thrust bars cooperate with each other to form a mounting frame for the fork, and this frame is of such width that, when it is applied to the tractor, its forward portion is at opposite sides of the tractor, as clearly shown in Figure 3. Forward push upon the thrust bars is exerted from the rear end of the tractor and, therefore, the tractor and the hay sweep can be easily driven forwardly or rearwardly and turning of the front wheels to steer the tractor will not be interfered with.

In order to yieldably support the forward end of the thrust bars and permit the hay sweep to conform to the contour of the land over which the hay sweep is moved, there has been provided suspending means which may be constructed as shown in Figure 4 or as shown in Figure 9. This suspending means for the forward portion of the frame consists of a cross beam or bolster 23 carrying levers 24 which are connected with the thrust bars, as shown in Figure 4. The cross beam or bolster rests upon the chassis bars 25 of the tractor upon end portions thereof which project forwardly beyond the radiator 26 of the tractor motor where it is firmly secured by U-bolts or shackles 27. The levers 24 are pivotally connected with end portions of the cross beam by bolts 28 passed through selected ones of the openings 29 formed in end portions of the cross beam, a plurality of these openings 29 being provided in order that the levers may be adjusted longitudinally of the cross beam. Lower end portions of the levers are curved outwardly to provide arms 30, each of which is formed with a plurality of openings 31 spaced from each other longitudinally thereof in order that the rings or shackles 32 may be engaged through selected ones of the openings and thus mounted in predetermined spaced relation to ends of the arms. Chains 33 are engaged through the rings 32 and also through the hangers or shackles 34 carried by the thrust bars 12 and ends of the chains are connected by snap hooks or equivalent releasable fasteners 35 so that the chains may be adjusted and cause the thrust bars of the frame to be normally maintained an even distance above the ground. A large and strong helical spring 36 extends horizontally over the cross beam and is formed with eyes 37 at its ends through which shackles 38 are engaged. These shackles are U-shaped and straddle upper portions of the levers 24 to which they are secured by bolts 39 passed through selected ones of the openings 40 formed through the arms in spaced relation to each other longitudinally thereof. This spring serves to yieldably resist movement of upper portions of the levers away from each other and the arms 30 of the levers and the chains 33 will, therefore, exert upward pull upon the thrust bars and downward movement of the thrust bars or movement of the thrust bars transversely of the tractor will be yieldably resisted. Auxiliary springs 41 are secured against the front face of the cross beam by a bolt 42 and these springs extend upwardly in diverging relation to each other with their upper ends engaged with chains 43. The chains 43 have their upper ends connected with shackles 44 which may be in the form of open rings engaged through upper ones of the openings 40, and upon referring to Figure 4, it will be seen that, while the springs 36 will at all times be under tension to yieldably resist pivotal movement of the levers 24, the springs 41 will only be extended and placed under tension after the levers have been moved about their pivot a sufficient distance to tighten the chains and exert pull upon the auxiliary springs. In view of the manner in which the frame is mounted, it will be yieldably held in its normal position with the skids out of engagement with the ground when not loaded, as shown in Figure 2, but when the fork is subjected to the weight of a quantity of hay or bundles of grain, the rear portion of the fork and the forward portion of the frame will be shifted downwardly to bring the skids into contact with the ground. It will thus be seen that the fork may be moved forwardly with the skids acting as runners and a heavy load of hay may be carried upon the fork.

In the modified construction illustrated in Figure 7 and Figure 8, there has been shown a cross beam which instead of being formed as a single beam consists of two beams 45. The beams 45 are held in spaced relation to each other by spacers 46 through which bolts 47 pass and between the spacers are disposed lower ends of the levers 48 which take the place of the levers 24 and are pivotally mounted by the bolts 47. These levers are formed with openings 49 spaced from each other longitudinally thereof and through selected ones of these openings are engaged hooks formed at ends of the spring 50 which takes the place of the spring 36. Pulley wheels 51 are rotatably mounted upon bolts or pins 52 between ends of the beams 45, and about these pulleys are engaged cables 53 having their lower ends tied to the shackles 34, as shown at 54, and their upper ends tied through selected ones of the openings 49, as shown at 55. The cables and pulley wheels take the place of the chain 33, and since the levers are yieldably held against movement away from each other by the spring 50, downward movement of the thrust bars or movement thereof transversely of the tractor will be yieldably resisted. If so desired, auxiliary springs, corresponding to the springs 41, may be provided in this embodiment of the invention. It will also be obvious that, if so desired, companion beams may be used in place of the single beam 23 in the embodiment of the invention illustrated in Figure 4 or that a solid beam could be used in the embodiment illustrated in Figure 7 in which case the levers and the pulleys will be pivotally mounted at one side of the beam instead of between the companion beams.

In Figure 9, the cross beam 55 may be formed solid or consist of companion beams spaced from each other. Upper and lower sets of openings 56 are formed in end portions of the beam 55 to receive bolts 57, by means of which the saddles of inverted U-shape are adjustably secured. These saddles extend upwardly from ends of the beam and upon the bridges at their upper ends springs 59 formed of a plurality of leaves are secured by U-bolts 60. These springs are of the type used upon vehicles and they extend longitudinally of the cross beam with end portions projecting outwardly therefrom. Hooks 61 are suspended from outer ends of the springs 59 for engagement through selected links of chains 62 which have their lower ends connected with eye bolts 63 secured through the thrust beams 12 in place of the shackles 34. In order to brace the springs when their outer ends are subjected to downward strain, the inner ends of the springs are engaged with bolts 64 carried by arms or metal strips 65 which are disposed vertically at opposite sides of the cross beam and have their lower ends connected with metal bars or strips 66 extending longitudinally of the cross beam at opposite sides thereof where they are secured by a bolt 67 passing through the cross beam and through the strip 66 at opposite sides thereof.

During use of the hay sweep, the fork must be tilted vertically about the bolt 17 which connects the standards 6 with the forwardly projecting portions of the strips 13 and 14 of the cross bars 12. In order to do so, there has been provided a latch lever 68 which is mounted upon the tractor in front of the driver's seat 69 and at one side of the steering wheel 70. A cable 71 extends forwardly from the latch lever and at its front end is secured through a selected one of the openings 72 formed in one end portion of an evener bar 73. This evener bar extends transversely of the tractor in front of the frame between the rear wall of the fork and upper portions of the levers 24. A forwardly extending shackle 74 is carried by the evener bar midway the length thereof, and through this shackle is engaged a cable 75 and has its ends secured through eye bolts 76. The other end of the evener has attached thereto the front end of a cable 77 which extends longitudinally of the tractor at the opposite side thereof from the cable 71 and has its rear end secured to the tractor, as shown at 78. It will be readily understood that by adjusting the lever 68 pull may be exerted upon the rear wall of the fork to swing the fork upwardly or the fork may be allowed to swing downwardly.

When this improved hay sweep is in use, it is positioned in front of the tractor with the thrust bars extending rearwardly under the tractor. The front wheels of the tractor are disposed between the thrust bars but the rear ends of the thrust bars extend between the rear wheels of the tractor and the rearwardly projecting ends of the plate 18 are overlapped and the bolt 20 passed through them to connect the thrust bars with the drawbar 21 of the tractor. The cross beam 23 is set in place upon the forwardly projecting ends of the chassis bars 25 of the tractor where it is secured by the U-bolts or shackles 27. The cable 77 is connected with the eye 78 at one side of the tractor and the rear end of the cable 71 connected with the latch lever 68. By actuating the latch lever the evener bar may be swung rearwardly to exert pull upon the cable 75 and draw the rear wall of the fork rearwardly. The fork will thus be tilted upwardly to move the front ends of its tines 2 out of engagement with the ground and the hay sweep can then be transported to the field in which it is to be used without likelihood of the tines catching upon obstructions and interfering with free forward movement. When the place of use has been reached, the lever will be swung forwardly to the position indicated by dotted lines in Figure 1 and shown in full lines in Figure 2 and the fork will then be tilted to the position shown in Figure 2 in which its tines will have their front ends close to the ground and hay or bundles of grain may be easily picked up. The hay moves rearwardly upon the fork until a full load has been taken up and the weight of the hay or grain will have a tendency to lower the rear end portion of the fork and bring the skids 5 into contact with the ground. After a full load has been taken up by the fork, the latch lever may be swung rearwardly to the position shown in full lines in Figure 1 and the weight of the load will then be borne by the skids 5 which will rest upon the ground, as shown in this figure. The hay sweep may then be moved across a field to the point where a hay stack is to be built or the bundles of grain loaded into a wagon or stored in a barn. During use of the device, the levers carried by the cross beam and the springs will serve to yieldably resist downward movement of the thrust bars 12 and also yieldably resist movement thereof transversely of the tractor. It will thus be seen that the frame formed by these thrust bars will be normally maintained in a horizontal position but they may have vertical movement and, in fact, they may have movement relative to each other in a vertical direction. By so mounting the thrust bars the fork may be tilted transversely in order to conform to the contour of land over which the hay sweep is moved and all hay and bundles of grain taken up. When use of the hay sweep is no longer needed, it may be easily disconnected from the tractor. While it has been stated that the invention is intended for use as a hay sweep, it will be obvious that other implements, such as a road scraper or the like, could be substituted in place of the fork mounted at front ends of the thrust bars 12.

Having thus described the invention, what is claimed as new is:

1. In a hay sweep, thrust bars for extending longitudinally of a tractor, means for connecting rear ends of said bars with the tractor, a cross beam, means for mounting the cross beam at the front of the tractor transversely thereof with its end portions projecting from opposite sides of the tractor over said thrust bars, spring-controlled means for suspending said thrust bars from end portions of said cross beam, a material-carrying structure having longitudinally extending tines and a rear wall extending upwardly adjacent rear ends of the tines, said rear wall being pivotally connected with front ends of said thrust bars for tilting movement about a horizontal axis, a flexible bridle extending rearwardly from the rear wall, an evener bar connected intermediate its ends with said bridle and extending transversely of the tractor in front of the same, means for anchoring one end of said evener bar and mounting the same for pivotal movement longitudinally of the tractor, and actuating means connected with the other end of the evener bar.

2. In a hay sweep, a frame adapted to be applied to a tractor with portions projecting forwardly therefrom, a material-carrying structure having longitudinally extending tines, cross bars fixed to rear end portions of said tines, standards extending upwardly from one of said cross bars in spaced relation to each other transversely of the material-carrying structure, strips carried by said standards transversely of the material-carrying structure and together with the standards forming a rear wall, a bridle of flexible material extending rearwardly from said wall and secured at its ends to the wall, an evener bar engaged with said bridle and disposed rearwardly thereof, means for connecting one end of said evener bar with the tractor, and actuating means connected with the other end of the evener bar.

3. In a hay sweep, a frame including thrust bars for extending longitudinally of a tractor and forwardly beyond the same, a material-carrying apparatus connected with front ends of said thrust bars for tilting adjustment about a horizontal axis, a cross beam for extending transversely of a tractor at the front thereof with end portions projecting from opposite sides of the tractor, levers pivotally connected with end portions of said cross beam, flexible members connecting said levers with said thrust bars and suspending the thrust bars from the levers, and resilient means between upper end portions of said levers yieldably resisting movement of the upper portions of the levers away from each other.

4. In a hay sweep, a frame, means for connecting the rear end of the frame with a tractor, a cross beam, means for mounting the cross beam at the front of the tractor transversely thereof, levers disposed vertically and pivotally connected with end portions of said cross beam, said levers having lower portions extending downwardly from the cross beam and curved outwardly, flexible members suspending the forward portion of said frame from the curved lower ends of said levers, a spring extending longitudinally of said cross beam over the same and having its ends connected with upper portions of said levers to yieldably resist pivotal movement of the levers in one direction, other springs secured to said cross beam intermediate the length thereof and extending upwardly from the cross beam, flexible members connecting upper ends of the last-mentioned springs with upper end portions of said levers and together with the last-mentioned springs serving as auxiliary means for yieldably resisting pivotal movement of the levers in said direction, and material-carrying means carried by front end of said frame.

5. In a hay sweep, material-carrying structure, thrust bars extending rearwardly from said material-carrying structure in position to extend longitudinally of a tractor at opposite sides thereof, means for connecting rear ends of said thrust bars with the tractor, a cross beam, means for mounting said cross beam upon the forward portion of the tractor with its end portions projecting from opposite sides thereof over the thrust bars, levers pivoted to said cross beam and extending upwardly therefrom, rotary guides carried by said cross beam, flexible members engaged with said guides and having their ends connected with the levers and the thrust bars, and a spring extending longitudinally of said cross beam over the same with its ends connected with upper portions of said levers to yieldably resist pivotal movement of the levers in one direction.

6. In a hay sweep, a material-carrying structure, thrust bars extending rearwardly from said material-carrying structure in position to extend longitudinally of a tractor at opposite sides thereof, means for connecting rear ends of said thrust bars with the tractor, a cross beam, means to mount the cross beam at the front of the tractor transversely thereof with its end portions projecting from opposite sides of the tractor over the thrust bars, saddles extending upwardly from end portions of said cross beam, leaf springs carried by said saddles and extending longitudinally of the cross beam with their inner portions overhanging the cross beam and their outer portions projecting beyond ends thereof, flexible members connecting outer ends of said springs with said thrust bars, strips extending longitudinally of said cross beam at opposite sides thereof and connected midway their ends with the cross beam, arms extending upwardly from end portions of said strips, and means for connecting inner ends of said springs with said arms.

7. In a hay sweep, thrust bars for extending longitudinally of a tractor, means for connecting rear ends of said bars with the tractor, a cross beam, means for mounting the cross beam at the front of the tractor transversely thereof over said thrust bars, spring-controlled means for suspending said thrust bars from said cross beam, a material-carrying structure having a rear wall extending upwardly adjacent its rear end, said material-carrying structure being pivotally connected with front ends of said thrust bars for tilting movement about a horizontal axis, a bridle extending rearwardly from the rear wall, an evener bar connected intermediate its ends with said bridle for extending transversely of the tractor in front of the same, means for anchoring one end of said evener bar and mounting the same for pivotal movement longitudinally of the tractor, and means for adjusting the angle of the evener bar.

8. In a hay sweep, a frame for extending longitudinally of a tractor and forwardly beyond the same, a material-carrying apparatus connected with the front end of said frame for tilting adjustment about a horizontal axis, a cross beam for extending transversely of a tractor, levers pivotally connected with said cross beam and spaced from each other longitudinally thereof, flexible members connecting said levers with said frame and suspending the frame from the levers, and resilient means between upper end portions of said levers yieldably resisting movement of the upper portions of the levers away from each other.

FERD. C. ROHWER.